HIGH CAPACITY GIN STAND

Original Filed June 26, 1962 7 Sheets-Sheet 1

INVENTORS
RICHARD M. SHELBURNE
EUGENE H. BROOKS
BY
Cushman, Darby & Cushman
ATTORNEYS

HIGH CAPACITY GIN STAND

Original Filed June 26, 1962 7 Sheets-Sheet 2

INVENTORS
RICHARD M. SHELBURNE
EUGENE H. BROOKS
BY Cushman, Darby & Cushman
ATTORNEYS HIGH CAPACITY GIN STAND
Original Filed June 26, 1962 7 Sheets-Sheet 3
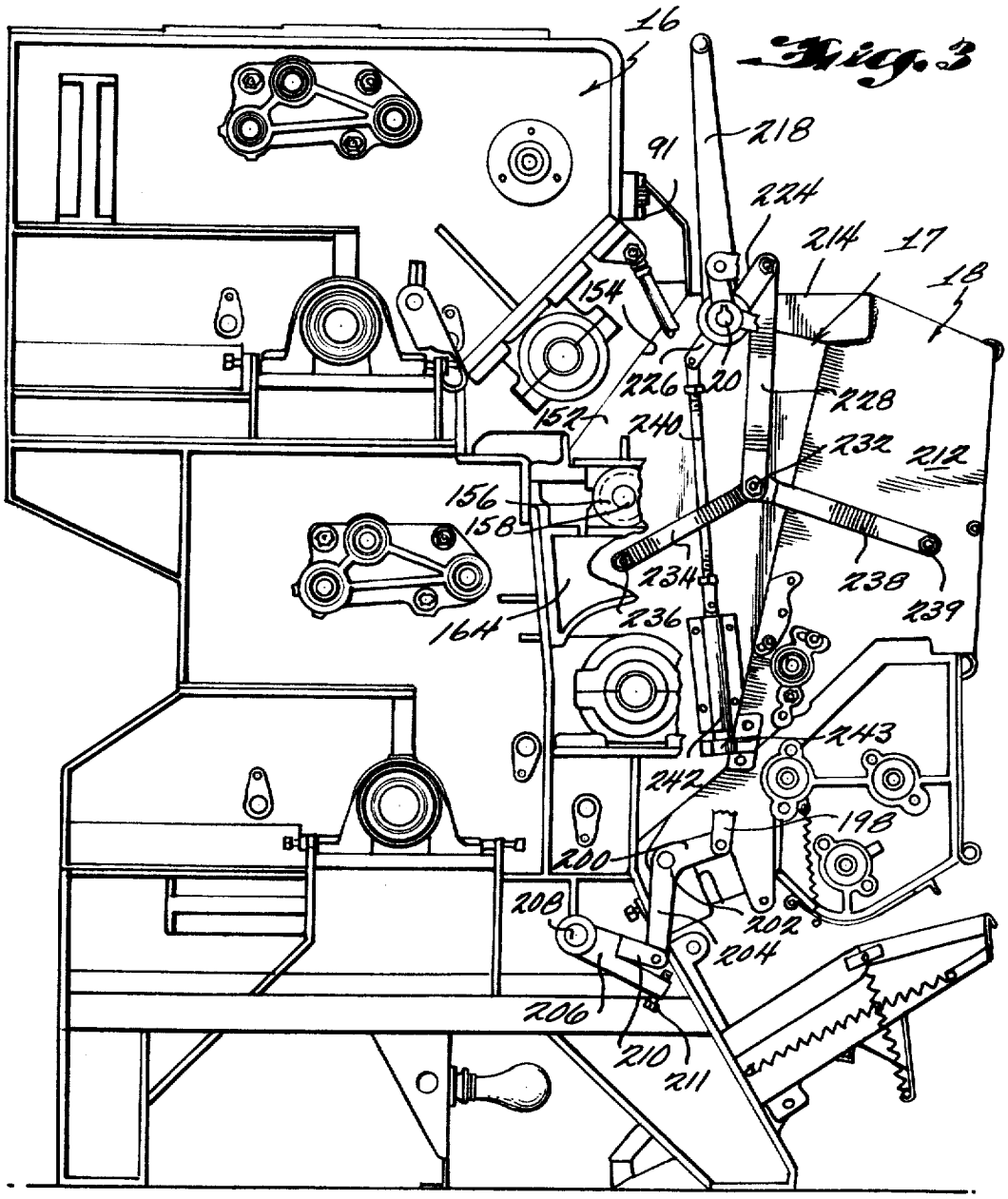
INVENTORS
RICHARD M. SHELBURNE
EUGENE H. BROOKS
By Cushman, Darby & Cushman
ATTORNEYS

HIGH CAPACITY GIN STAND

Original Filed June 26, 1962 7 Sheets-Sheet 4

INVENTORS
RICHARD M. SHELBURNE
EUGENE H. BROOKS
BY Cushman, Darby & Cushman
ATTORNEYS

HIGH CAPACITY GIN STAND

Original Filed June 26, 1962 7 Sheets-Sheet 5

INVENTORS
RICHARD M. SHELBURNE
EUGENE H. BROOKS
BY Cushman, Darby & Cushman
ATTORNEYS INVENTORS
RICHARD M. SHELBURNE
EUGENE H. BROOKS
BY Cushman, Darby & Cushman
ATTORNEYS

HIGH CAPACITY GIN STAND

Original Filed June 26, 1962 7 Sheets-Sheet 7

INVENTORS
RICHARD M. SHELBURNE
EUGENE H. BROOKS
BY Cushman, Darby & Cushman
ATTORNEYS United States Patent Office Re. 26,446
Reissued Aug. 27, 1968

26,446
HIGH CAPACITY GIN STAND

Eugene H. Brooks and Richard M. Shelburne, Sherman, Tex., assignors to Hardwicke-Etter Company, Sherman, Tex., a corporation of Texas Original No. 3,266,101, dated Aug. 16, 1966, Ser. No. 205,245, June 26, 1962. Application for reissue Feb. 8, 1967, Ser. No. 617,439
11 Claims. (Cl. 19—57)

Matter enclosed in heavy brackets [ ] appears in the original patent but forms no part of this reissue specification; matter printed in italics indicates the additions made by reissue.

*ABSTRACT OF THE DISCLOSURE*

*A dual cotton gin having an upper and a lower ginning stage each of which includes a saw cylinder projecting into a common roll box and a separate lint exhaust duct. An air inlet passage, disposed intermediate the stages, extends from the rear of the gin to the upper stage. The gin also includes mote handling means and a breast section which are described in detail.*

*A large installation includes a battery of the dual gins and a separate lint cleaner for each stage of each gin. The lint cleaners discharge to a common lint condenser, or a separate condenser may be provided for all upper stages and for all the lower stages.*

This invention relates to a dual cotton gin stand of new and improved construction and ginning installations operative to accommodate the extremely high output afforded by the instant invention. Further, this invention contemplates the provision of a dual cotton gin stand with new and improved means for actuating the gin stand breast section and huller front.

Modern methods of harvesting cotton have given rise to increased production demands of cotton gins in order that a season's harvest may be processed in a short period of time. Earlier efforts to provide a gin stand of very high capacity have been addressed in varying degrees to the provision of dual gin stands, such as disclosed in the Evans Patents No. 1,464,810, No. 1,464,811, No. 1,480,054 and No. 1,542,293. Other efforts to increase ginning production have been directed to increasing the saw speeds. These efforts have not been entirely successful in view of the tendency of increasing fiber damage, reducing the staple length and the quality of ginning. Also, earlier efforts have been directed to relieving the friction of the roll box, thereby causing the roll to turn more freely, as by power drive means. Efforts to increase capacity of the gin stands by increasing the gin saw diameter or the size of the roll box, have still presented the problem of crowding the cotton through the rib gap with the attendant harmful results.

According to this invention, there is provided a dual gin stand of very high capacity, the gin stand including two ginning stages positioned one above the other. In this regard, an additional saw cylinder and doffing means is provided which operates to accelerate the roll, strike the roll at places where unginned cotton is missed by the lower saw cylinder, and is capable of ginning approximately the same amount of cotton as the lower saw cylinder. A significant feature of the present invention includes means for providing a superior inflow of air to the upper ginning stage, by virtue of providing an air flow intermediate the upper and lower ginning stages.

Further, this invention includes new and improved means for cleaning the mote sweeps to prevent the latter from becoming clogged during their rotary movement adjacent each saw cylinder.

This invention also contemplates the provision of a breast section actuating mechanism operative to move the breast section on tracks forwardly of the stationary casing in a new and improved manner, there also being provided a huller front pivotally mounted to the breast section actuating linkage, so that the huller front can be actuated independent of the breast section actuating means. Due to the greater vertical weight distribution of the dual gin stand, the construction and arrangement of this movable front portion of the gin stand provides a superior ease of control with a minimum of adverse stress on the moving parts.

Another feature of this invention resides in the provision of ginning installations operative to clean, condense, and press the ginned cotton, which installations include dual gin stands according to this invention, the installations being operative to process the ginned cotton in a notably superior manner. In this regard, cotton production is materially enhanced due to the high output of the instant dual gin stand, while the investment in the equipment is materially reduced. This is occasioned by the fact that only half the number of gin stands and extractor feeders are required to process the cotton, and attendant savings are realized in building construction, reduction in horsepower requirements for the gin stands, and the like.

These and still further objects, advantages, and novel features of the present invention will become apparent in the specification and claims taken in connection with the accompanying drawings.

In the drawings:

FIGURE 3 is a left side elevation view of the dual gin stand;

The dual gin stand

Figure 1:
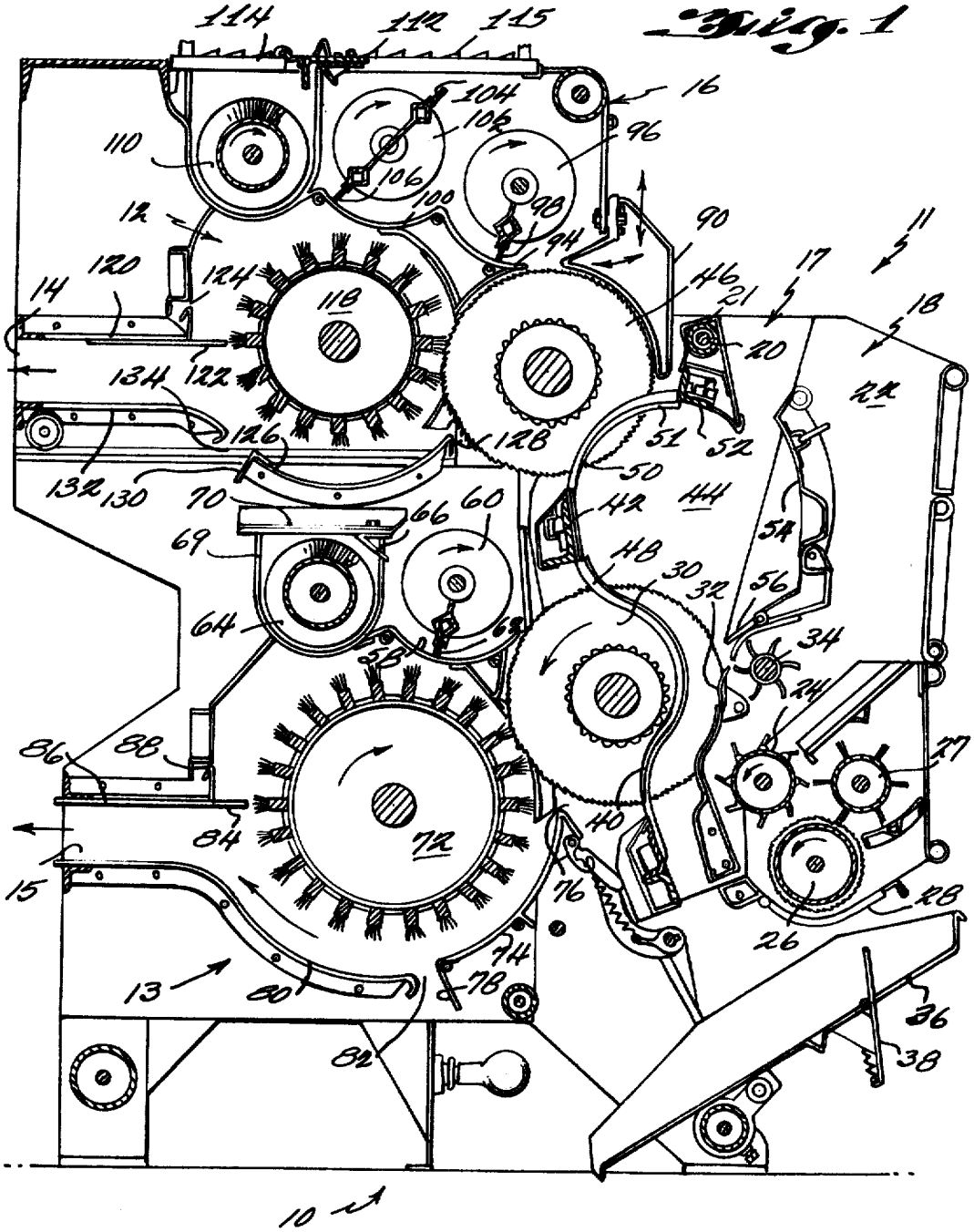
FIGURE 1 is an elevational view in section of the dual gin stand according to this invention.

Referring now to FIGURE 1, there is shown a dual gin stand 10 having an inlet 11, communicating with upper and lower gins 12 and 13, respectively. Upper and lower discharge outlets 14 and 15 communicate with the respective upper and lower gins 12 and 13, these outlets extending horizontally from the gin stand 10 opposite the inlet end.

The dual gin stand 10 includes a stationary casing 16 supported on the floor, or the like, and carries at its front or inlet end a movable breast section 17. This breast section is longitudinally movable towards and away from the casing 16, through a linkage arrangement to be explained. The breast section 17 pivotally carries at its front end a huller front 18, which is movable by a linkage arrangement, likewise to be explained. Two concentric shafts pass transversely through the breast section 17, the inner shaft 20 operatively carrying the breast section actuating linkage, while the outer shaft 21 carries the huller front actuating linkage.

These mechanisms will be discussed hereinafter, and are here mentioned to describe the general structural arrangement of the dual gin stand 10.

The dual gin stand 10 (FIGURE 1) will now be described in detail.

The bottom end of the huller front 18 communicates with a picker roll 24. A reclaim saw cylinder 26 is positioned downwardly below and adjacent to the picker roll 24, a doffing brush 27 being positioned adjacent the reclaim saw cylinder 26. A bottom scroll 28 is positioned adjacent to and below the reclaim saw cylinder 26 in the usual fashion. The lower gin 13 includes a saw cylinder 30, split huller ribs 32 being positioned adjacent the outer periphery of the lower saw cylinder 30 in the usual fashion. An auxiliary picker roll 34 is positioned adjacent the upper ends of the split huller ribs 32 within the huller front 18.

A seed pan 36 is positioned for pivotal movement at the bottom front of the gin, stand, a spring-loaded directional valve plate 38 being connected to the seed pan 36 in the usual fashion. This huller front construction is well known in the art and operates in the usual fashion as follows: the seed cotton enters the huller front 18 and falls into the picker roll 24, then passes to the lower saw cylinder 30 through the huller ribs 32. The hulls or sticks are obstructed by the huller ribs 32, are thrown back by the auxiliary picker roll 34, where they are carried around and passed to the reclaim saw cylinder 26 and are forced over the hinged bottom scroll 28, falling by gravity onto the seed pan 36. Here, the directional valve plate 38 may be set to either direct the hulls or sticks into a seed chute (not shown) or directed oppositely, to fall out and be separated from the seed.

Lint cotton that may be in the hulls which are forced over the bottom scroll will be picked up by the reclaim saw cylinder 26. The doffing brush 27 runs at a higher peripheral speed than the reclaim saw cylinder 26 so as to doff the lint cotton and pass it back to the picker roll 24 and back to the lower saw cylinder 30.

The lower saw cylinder 30 is composed of 89 saws spaced at a center-to-center distance of .763 inch. Lower ginning ribs 40 are positioned between the saws of the lower saw cylinder 30, being connected at their upper ends to an angle plate 42. A roll box 44 is positioned in communication with the lower saw cylinder 30 and the upper saw cylinder 46 of the upper gin 12. The portion 48 of the lower ribs 40 between the outer periphery of the lower saw cylinder 30 and the angle plate 42 is provided with a gap of approximately one-eighth inch so that the seed cannot pass through this gap, but only the lint cotton pulled off from the seed. The upper saw cylinder 46 is composed of 88 saws placed a distance of .763 inch center-to-center, there being provided upper ginning ribs 50 interposed between the saws connected at their lower ends to the angle plate 42 and at their upper ends to an upper angle plate 52.

The saws in the upper saw cylinder 46 are axially displaced a distance of .763 inch to space the saws directly between the saws of the lower saw cylinder 30, so that unginned seeds not exposed to the lower saw cylinder 30 are exposed to the upper saw cylinder 46. The portion 51 of the upper ginning ribs 50 between the periphery of the upper saw cylinder 46 and the upper angle plate 52 are likewise provided with a gap of approximately one-eighth inch. A front roll box door 54 defines the forward end of the roll box 44, and adjustable seed fingers 56 are positioned at the bottom of the roll box 44.

The upper saw cylinder 46 advantageously operates to accelerate the roll, striking the portions of the roll between the saw positions of the lower saw cylinder 30 where there is unginned seed. The upper saw cylinder 46 gins approximately the same amount of cotton as the lower saw cylinder 30. The roll turns on around against the front roll box door 54, passing over the adjustable seed fingers 56. The cleaned seed is permitted to fall downwardly between the lower ginning ribs 40 and the split huller ribs 32 into the seed pan 36.

The upper saw cylinder 46, by accelerating the turning action of the seed roll, enables the lower saw cylinder 30 to gin more cotton than normally possible, due to this turning action.

The saws of the bottom saw cylinder 30 are 12 inches in diameter, while the saws of the upper saw cylinder 46 are 11¼ inches in diameter; the saws on the bottom saw cylinder have 282 teeth, while the saws in the upper saw cylinder 46 have only 264 teeth, thus making the size of the teeth in both saw cylinders the same. By virtue of this arrangement, after the saws on the lower saw cylinder have been filed down from sharpening by approximately ⅛ inch diameter from their original size, they may then be recut and used on the upper saw cylinder 46, thereby prolonging their useful life.

Positioned adjacent the lower saw cylinder 30 opposite the roll box 44 is an upwardly curved and adjustable scroll 58, or mote blade. This area above the curved scroll 58 receives motes driven from the lower saw cylinder 30, and carries a mote sweep 60 in the form of a shaft having a flexible paddle 62 carried thereby, for engagement with the circular upper surface of the scroll 58. A mote conveyor 64 is positioned adjacent the lower mote sweep 60, and takes the form of a screw conveyor operative to convey the motes transversely out of the gin stand 10 to be dropped into a refuse line (not shown) to be carried away.

Carried adjacent the upper end of the mote conveyor 64 are longitudinally extending, downwardly inclined scratchers 66 which extend into the path of the flexible paddle 62 of the mote sweep 60 to scratch off any accumulation of lint that might be on the paddle 62. This arrangement advantageously prevents the mote sweep 60 from wrapping with lint cotton. The scratcher 66 is in the form of a notched, angularly depending plate 67 (FIG. 2A) which plate is longitudinally adjustable by virtue of upstanding bolts 68 passing through longitudinal slots (not shown). Preferably, the points of the scratcher 66 are approximately 1½ inches apart at their lower free end. A housing 69 surrounds the conveyor 64 and it may be provided with a suitable access door (not shown) and a top cover plate 70.

A doffing brush 72 is positioned adjacent the lower saw cylinder 30 in the known manner to doff the lint from the saws. The lower doffing brush 72 is enclosed by a bottom scroll piece 74 which is spaced from the lower saw cylinder 30 at its adjacent end, leaving a gap 76 therebetween. The opposite end of the bottom scroll piece 74 is downwardly flanged at 78. A bottom duct scroll 80 defines a portion of the outlet passage 15, this duct scroll 80 being spaced from the flanged end 78 of the bottom scroll 74, leaving an air inlet gap 82.

A usual air cutoff plate 84, longitudinally adjustable, is carried by a duct plate 86 which defines the remaining portion of the bottom outlet 15. The usual vertically adjustable air gap 88, above the air cut-off plate 84, admits a small volume of air to the doffing brush 72 to keep the chamber above the brush 72 clean and otherwise clear of accumulation.

The upper gin 12 is arranged generally similar to the lower gin 13. Positioned above and adjacent to the upper saw cylinder 46 is an adjustable scroll piece 90 (FIGURE 2b). The scroll piece 90 is connected to the gin stand by a mounting bolt 91 which passes through a vertical slot 91' in the adjacent wall of the casing to thereby provide vertical adjustment. The inner surface of the scroll piece 90 adjacent to the bolt 91 has a horizontally extending hump or crowned portion 92; and leveling set screws 93 and positioned above and below this horizontal hump portion 92. When the mounting bolt 91 is tightened at its desired vertical position, the scroll piece 90 may be tilted by suitable adjustment of the set screws 93 in order to tilt the lower end of the scroll piece 90, to insure proper positioning relative to the upper side of the saw cylinder 46. This arrangement provides clearance for the amount of moting to be accomplished by the upper saw cylinder 46, i.e., more clearance affords greater moting, while less clearance affords a reduced moting.

A curved scroll 94, or mote blade, is positioned adjacent the upper periphery of the upper saw cylinder 46, operative in a manner generally similar to the scroll 58. As with the lower gin 13, an upper mote sweep 96, carrying a flexible paddle 98 is positioned for sweeping the motes along the upper surface of the scroll 94, this scroll 94 thence merging to an adjacent circular scroll 100. A rear mote sweep 102, having opposed extending flexible paddles 104, 106 is positioned for sweeping the upper surface of the adjustable circular scroll 100; and a transverse mote conveyor 110 is positioned downstream of and adjacent to the rear mote sweep 102.

Further, depending adjustable scratchers 112 identical to the scratchers 66 operate to clean the lint which is accumulated on the paddles 104, 106.

Pivotal access doors 114, 115 mounted to the top of the stationary casing 16 provide access to the mote conveyor 110 and the mote sweeps 96, 102, respectively. An upper doffing brush 118 is positioned slightly above the axis of the upper saw cylinder 46 and in communication with the upper outlet duct 14. The upper outlet duct 14 includes a top plate 120 carrying an adjustable air cutoff plate 122, this portion of the outlet duct having the usual air gap 124 above the air cutoff plate 122 for keeping the chamber clean.

According to one important feature of the present invention, the doffing brush 118 is enclosed at its lower end by a scroll piece 126 which is positioned in spaced apart relationship above the cover plate 70 of the lower mote conveyor 64. The inner end of this scroll piece 126 is spaced apart from the upper saw cylinder 46, defining an air inlet gap 128.

The scroll piece 126 has a downwardly flanged outer end 130 and defines with a bottom duct plate 132 an air inlet gap 134. The air inlet gap 134, as with the air gap 82, is a safety feature to prevent a blockage of the air flow and lint in the outlet ducts 14 and 15 which lead from the gin stand 10 to the lint flue (not shown). The air and lint under back-pressure may escape from these gaps so as not to back up into the teeth of the saw cylinders and break the ribs. However, the spaced apart relationship of the scroll piece 126 with reference to the conveyor plate 70 allows air to enter the air gap 128, which is the low-pressure area. This arrangement operates to admit air required for the upper doffing brush 118 so that after the lint is doffed from the upper saw cylinder 46 the lint can be carried through the outlet duct 14 and out of the dual gin stand 10. By virtue of this arrangement there is a reduction of floor space due to the gin stages being positioned in vertical relationship to one another. Efficieent operation of the upper gin is not sacrificed due to an inadequate air supply.

The breast section lift assembly

As previously stated, the breast section 17 of the gin stand 10 is connected to the stationary casing 16 so that the same may be moved forward and away from the stationary casing 16, out of the ginning position.

Figure 2:
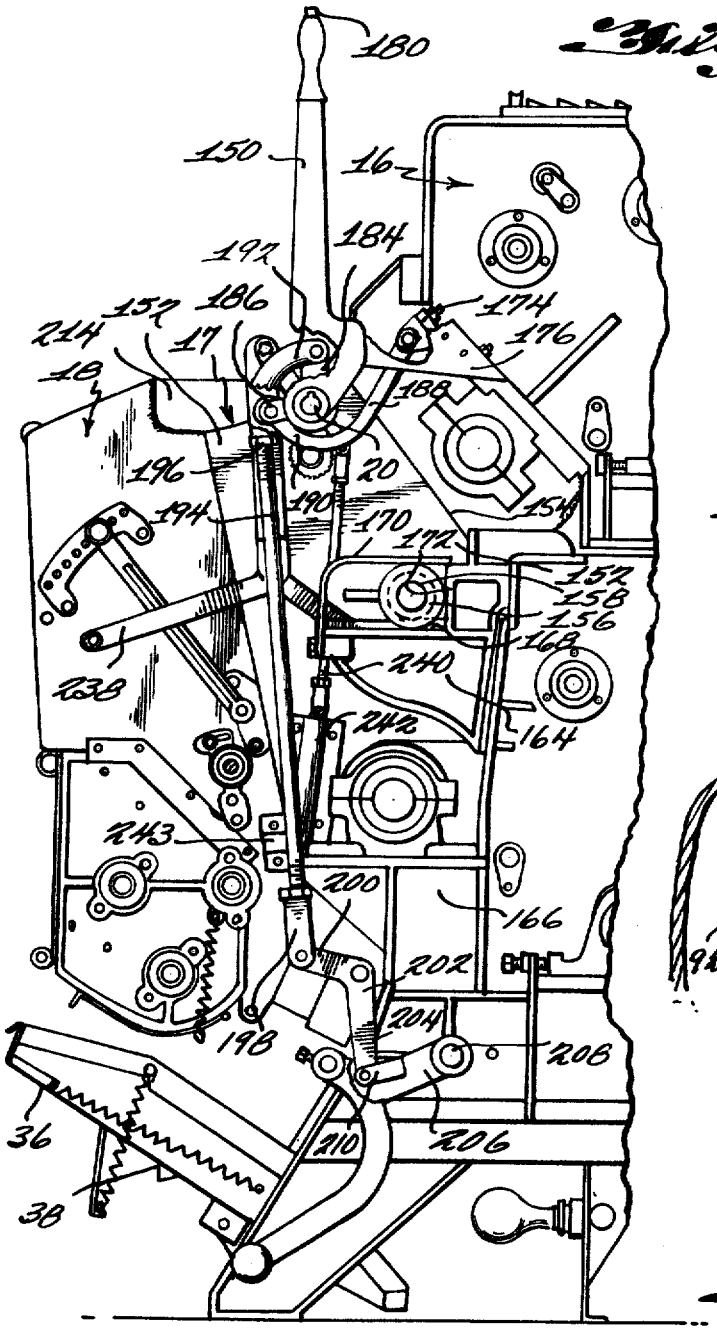
FIGURE 2 is a right side elevation of the dual gin stand.
Figure 2A:
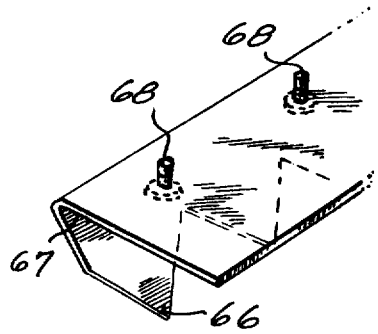
FIGURES 2a and 2b are detail perspective views of the scratcher and scroll piece in the gin shown in FIGURE 1.
Figure 2B:
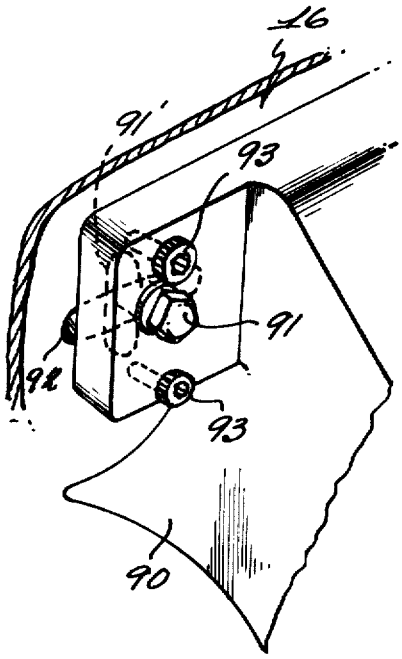

FIGURE 2 shows the right side of the gin stand 10 with the various elements positioned for operation as shown in FIGURE 1.

This right side of the gin stand 10 carries a breast lift lever 150, which is operatively connected to the inner transverse shaft 20 to move the breast section 17 (together with the huller front 18) away from the stationary casing 16. As will now be explained, the breast section 17 is mounted for longitudinal movement on a track arrangement when linkage on both sides of the gin stand 10 is actuated by the breast lift lever 150.

Figure 4:
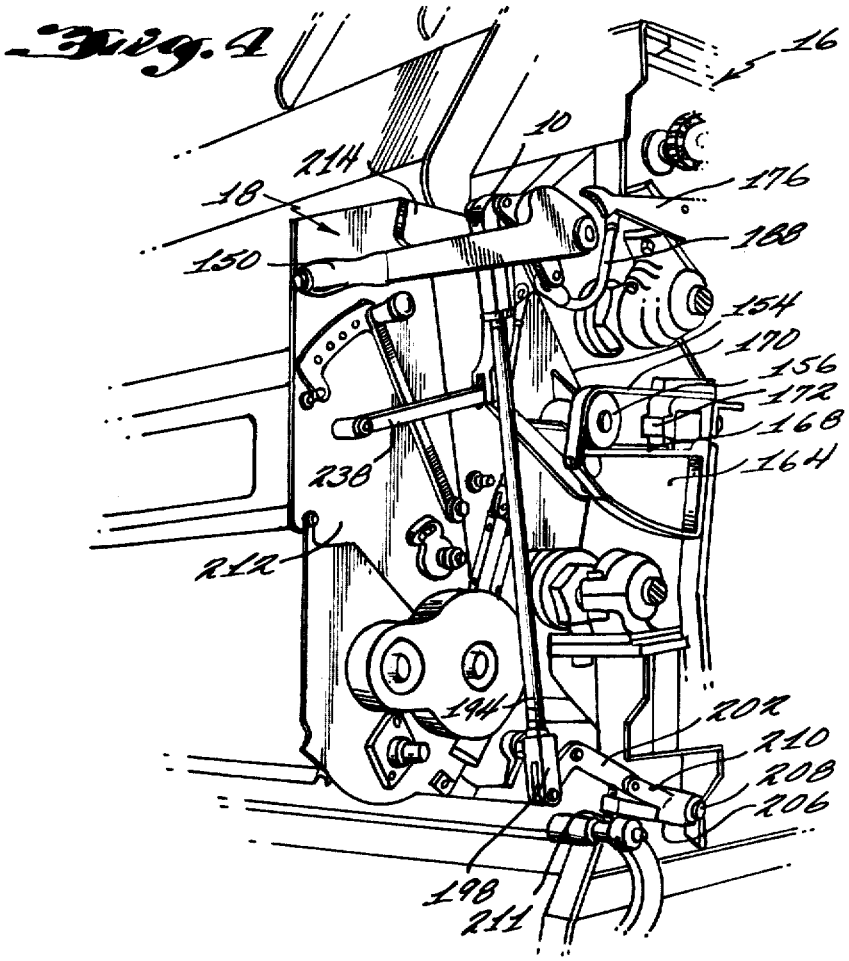
FIGURE 4 is a perspective view of the gin stand with the breast section moved forward of the stationary casing.
Figure 5:
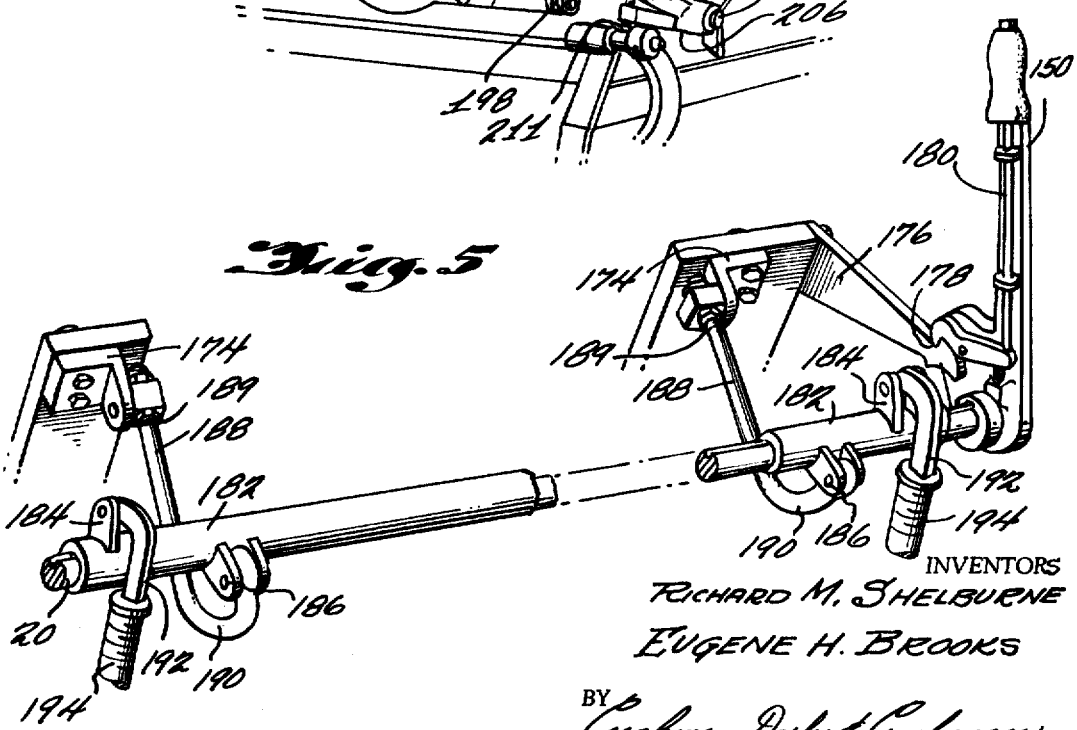
FIGURE 5 is a perspective view of the breast section actuating linkage.

FIGURE 4 shows the breast section 17 moved away from the stationary casing, while FIGURE 5 shows the actuating linkage. Like numerals on the left side of the gin stand 10 (FIGURES 3 and 6) refer to the same elements.

The breast section 17 is formed of a side plate 152 (FIGURE 2 and 3) having an inclined inner end 154 adapted to be positioned rearwardly adjacent the stationary casing 16. This side plate 152 carries an outwardly extending peripherally recessed roller 156 mounted on a bearing shaft 158. The stationary casing 16 carried a forwardly extending upper supporting bracket 164 for supporting the roller 156, the top surface 168 (FIGURE 4) thereof being of a cooperatively crowned configuration and constituting a track for receiving the upper roller 156. In the preferred form this crown-and-recess engagement may take the form of a V-shaped peripheral recess in the roller 156 while the track 168 is upwardly V-shaped in transverse section. Thus, the breast section 17 is carried by these upper rollers 156 on both sides thereof. Suitably bent guide bars 170 are carried above the track 168 to serve as a safety device to prevent the breast section 17 from rolling off the track 168 in the front position when the associated linkage is disconnected for dismantling the breast section 17 from the gin stand, or the like. A machined stop 172, mounted at the rearward end of the track 168 and part of the bracket 164, limits the inward path of movement of the roller 156.

As will now be explained, linkage is provided for moving the rollers 156 into their outer position, wherein the breast section 17 is separated from the stationary casing 16. The forward end of the stationary casing 16 carries a downwardly inclined mounting bracket 174 spaced rearwardly and upwardly of the concentric shafts 20 and 22. This bracket 174 carries a latching plate 176 having a detent 178 in its upper surface. The lever 150 is drivingly joined, as by a keyway connection, to the inner shaft 20, in alignment with the latching plate 176. The lever 150 conveniently carries a push-button locking linkage 180, of the well-known type, so that when the lever is in its vertical position, FIGURE 2, the locking linkage 180 is engaged with the detent 178 on the latching plate 176. This constitutes a locked position, so that during operation of the gin stand 10 inadvertent movement of the breast section 17 is prevented.

The inner shaft 20 also drivingly carries a bell crank 182 as by a keyway connection. This bell crank has an upright first link 184 which is slightly over-center when in the closed position (FIGURE 2) and a forwardly and downwardly extending second link having a pivot pin 186. The mounting bracket 174 carries a clevis rod 188 which is of generally J-shaped configuration and is pivotally connected to the second link at 186 at its curved free end 190. This clevis rod 188 is longitudinal adjustable to a threaded connection 189 so that the same is operative to pull the breast section 17 towards the stationary casing 16, to a point where the roller 156 just abuts a machined surface of the bracket 164, when the lever 150 is in the latched position. The first link 184 carries an arcaute link 192 which extends forwardly and downwardly relative to the shaft 20. The opposite lower end of this arcuate link 192 carries a tie rod 194 by an adjustable threaded connection 196 (FIGURE 2). This tie rod 194 extends downwardly and slightly rearwardly, being pivotally joined at its bottom end 198 to the upper link 200 of a bell crank 202. This bell crank 202 is pivoted to the side plate 152 adjacent the stationary casing 16 and has a downwardly extending, overcenter arm 204. A lower breast lift lever 206 is pivotally connected to the stationary casing 16 at 208, this lever 206 being pivotally connected to the bell crank arm 204 of the bell crank 202, at 210.

The inner shaft 20, carrying this linkage, is independently rotatable with respect to the outer shaft 22. When the breast section 17 is in the ginning position, it is locked in place, as stated, and when the breast section 17 is to be moved forward (FIGURE 4), the operator depresses the push-button linkage 180 and pivots the lever arm 150 forwardly and downwardly, thereby rotating the bell crank 182 on the shaft 20.

When this occurs, the upper portion of the breast section 17 is forced outwardly along the track 168 by virtue of the fact that the second link 186 causes a separation from the secondary casing 16 due to its connection with the clevis rod 188, which latter arrangement is connected to the casing 16. In other words, the top section is pushed away by the force transmitted to the breast section 17. Also, this movement of the bell crank 182 rotates the shaft link 184 downwardly causing the tie rod 194 to move downwardly. This downward movement pivots the bell crank 202 in a counterclockwise direction (FIGURE 2) which force is transmitted to a separating force between the bell crank arm 204 and the lever 206, pivotally connected to the casing 16. By virtue of this arrangement, the lower end of the breast section 17 as well as the top portion, are both pushed out with an even distribution of force.

The same linkage is provided on the left side of the machine (FIGURES 3 and 6) so that no unbalanced stresses are placed on the structure during this movement. When it is desired to move the breast section 17 back to the closed position, the lever 150 is simply moved upwardly towards the stationary casing 16 whereby the movement is reversed. When the extreme position is reached, the locking linkage 180 and the latch plate 176 are engaged. By virtue of the over center arrangement of the bell crank 182, any force exerted by the breast section 17 will not be transmitted to the breast lift lever 150.

Figure 6:
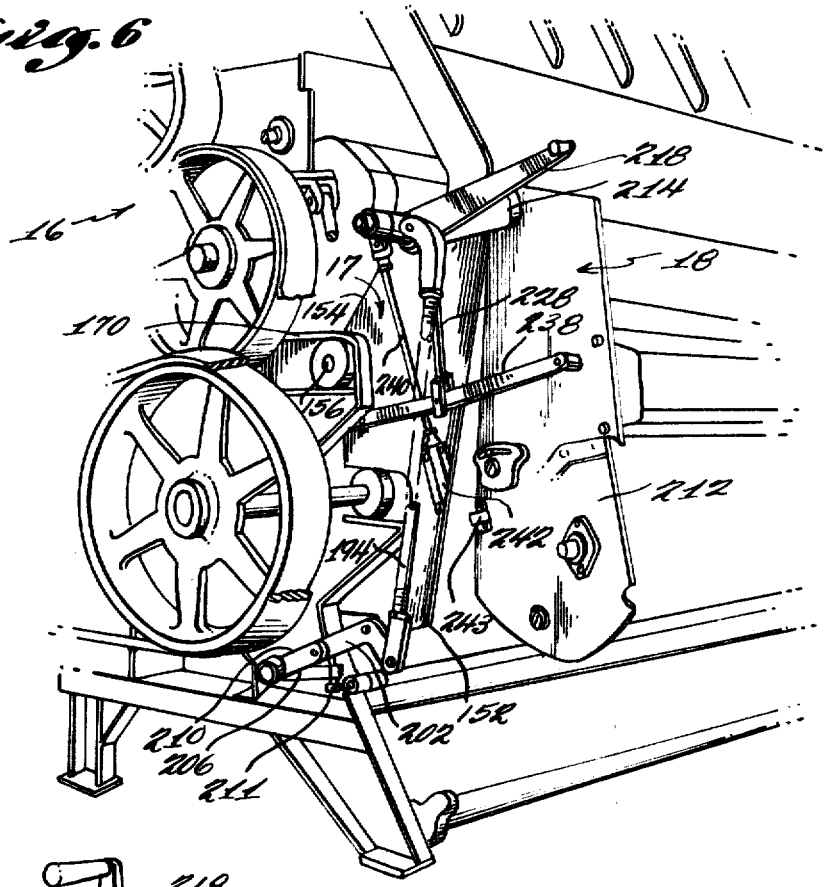
FIGURE 6 is a perspective view similar to FIGURE 4, showing the breast section moved forwardly, and the huller front pivoted to dump the roll.

In order to limit the movement of the breast section 17 in the outer position, the lever 206 carries a set screw 211. When the arm 204 and the lever 206 are straightened out and slightly over center, the adjustable set screw 211 abuts the arm 204, stopping further rotation of the bell crank 202 (FIGURES 4 and 6). This occurs before the rollers 156 reach the outer end of the rack 168 and before they touch the bar 170.

The roll dump assembly

Figure 7:
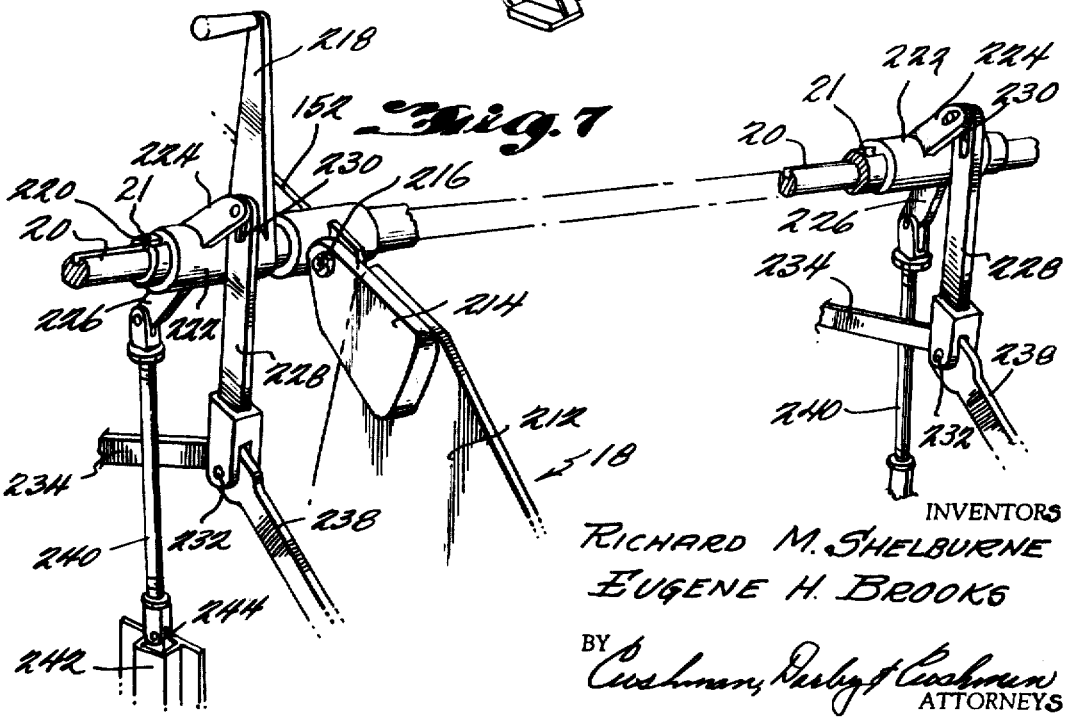
FIGURE 7 is a perspective view of the linkage operative to pivot the huller front relative to the breast section.

In order to dump a roll, the huller front 18 is pivotally connected to the front end of the breast section 17. In this regard, the huller front 18 includes a side plate 212 (FIGURES 3 and 7) having a support plate 214 welded to the top of the side plate 212 at its one end, and freely pivotally connected to the breast section side plate 152 via a transverse bolt connection 216. While both sides of the gin stand 10 carry linkage to accomplish this pivotal movement, the left side of the gin stand (FIGURES 3, 6 and 7) carries a roll dump actuating lever 218 for accomplishing this purpose.

The roll dump lever 218 is drivingly joined, as by a keyway connection 220 to the outer shaft 21. This outer shaft 21 also carries, as by a keyway connection, a bell crank 222. This bell crank 222 has first and second arms 224 and 226 mounted in opposed relationship to one another, the first arm 224 extending forwardly and upwardly relative to the stationary casing 16, the second arm extending oppositely therefrom. An actuating lever 228 is pivotally connected to the free end of the first arm 224, the lever 228 having an elongated slot 230 at this pivot connection, for reasons to become apparent. The actuating lever 228 extends downwardly along the side of the breast section side plate 152, which has a pivot joint 232 at its lower end. Connected to this pivot joint 232 is linkage taking the form of an angularly extending arm 234, pivotally connected at its one end to the joint 232, its opposite free end 236 (FIGURE 3) being pivotally connected to the side plate 152 of the breast section 17. Another angularly extending arm 238 is connected to the pivot joint 232 at the bottom of the actuating lever 228, its opposite free end 239 being pivotally connected to the side plate 212 of the huller front 18 at 239. The second arm 226 carries a threaded latching rod 240 which is longitudinally adjustable and operative to lock the huller front 18 adjacent the breast section 17 when in the closed position (FIGURE 3), but upon movement of the lever 218 and its bell crank 222, the rod 240 is moved upwardly to free the two parts so that the huller front 18 can be pivoted outwardly (FIGURE 6). Accordingly, the breast section side plate 152 carries a tubular socket 242 conveniently in the form of a longitudinally recessed flanged plate. Carried by the huller front side plate 212 is a rearwardly extending latching member 243 which has a recess for alignment with the tubular socket 242 when the plates 212 and 152 abut one another. The latching rod 240 carries a pivoted locking pin 244, FIGURE 7, which is normally received in the socket 242 and the latching member 243, but upon upward movement thereof the connection between these two elements is freed so that the pivotal movement of the huller front 18 is not obstructed.

For operating the roll dump mechanism, the actuating lever 218 is pivoted forwardly and downwardly, rotating the outer shaft 21 and the bell crank 222. The movement causes the actuating lever 228 to move downwardly along its axis thereby pivoting the huller front 18 outwardly due to the combination of the angular relationship of the arms 234 and 238 which are pivoted downwardly, causing an expansion of the distance between their pivot connection to the breast section side plate 152 and the huller front plate 212.

As stated, there is provided a slotted connection between the arm 224 and the lever 228 so that a lost motion is provided before downward movement of the actuating lever 228 takes place—when lever 228 is first moved. This allows the second arm 226, which is moving upwardly, to first release the latching connection of the pin 224 with the socket 242 carried by the breast section 17 and the aligned latching member carried by the side plate 212 of the huller front 18.

Thus, by virtue of this lost motion arrangement, the elements are unlatched from one another before the pivotal movement of the huller front 18 begins. Of course, this movement is independent of the movement of the breast section relative to the stationary casing 16 in view of the fact the concentric shafts 20 and 21 are not drivingly connected to one another. A similar linkage is provided on the right side of the gin stand 10 (FIGURE 2) wherein like numerals refer to identical elements. FIGURE 6 shows the huller front 18 pivoted outwardly of the breast section 17.

For pivoting the huller front 18 back to its closed position, the lever 218 is simply pivoted oppositely, causing the bell crank 222 to move counterclockwise, so that the reverse movement takes place and the huller front 18 is again latched to the breast section 17.

The ginning installation with the dual gin stand

In view of the very high capacity of the dual gin stand 10, and the number of bales per hour capable of being processed, there is raised the problem of handling this high amount of lint cotton for cleaning purposes. According to another feature of the present invention, here are provided installations for handling the lint cotton for cleaning purposes which are processed through the dual gin stand, or a battery of such gin stands as described.

Figure 8:
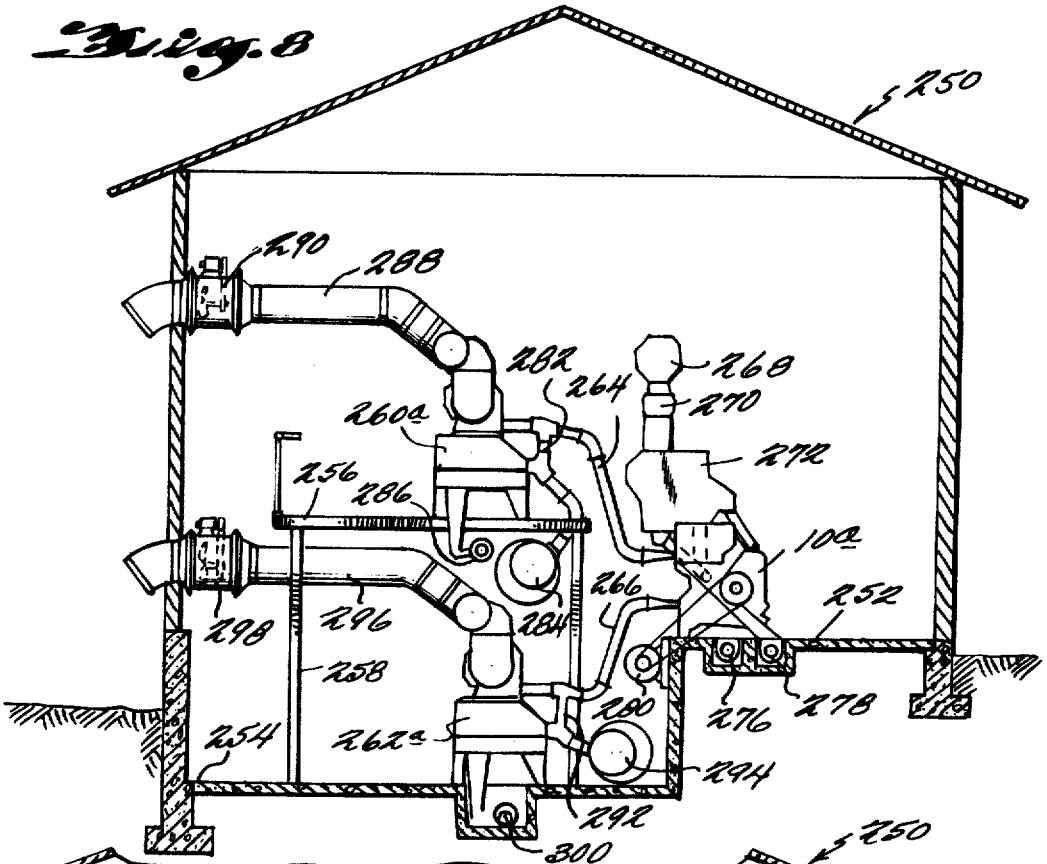
FIGURE 8 is an elevation view of one embodiment of a ginning installation utilizing a battery of dual gin stands according to this invention.
Figure 10:
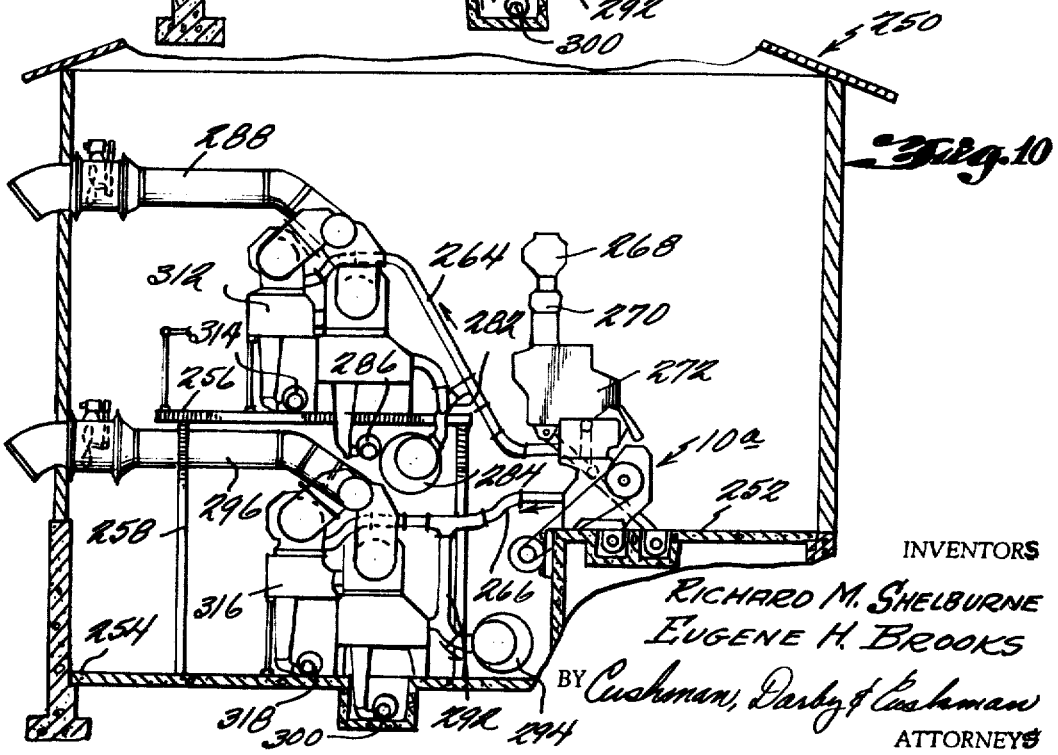
FIGURE 10 is an elevation view of another ginning installation according to this invention.
Figures 9, 11:
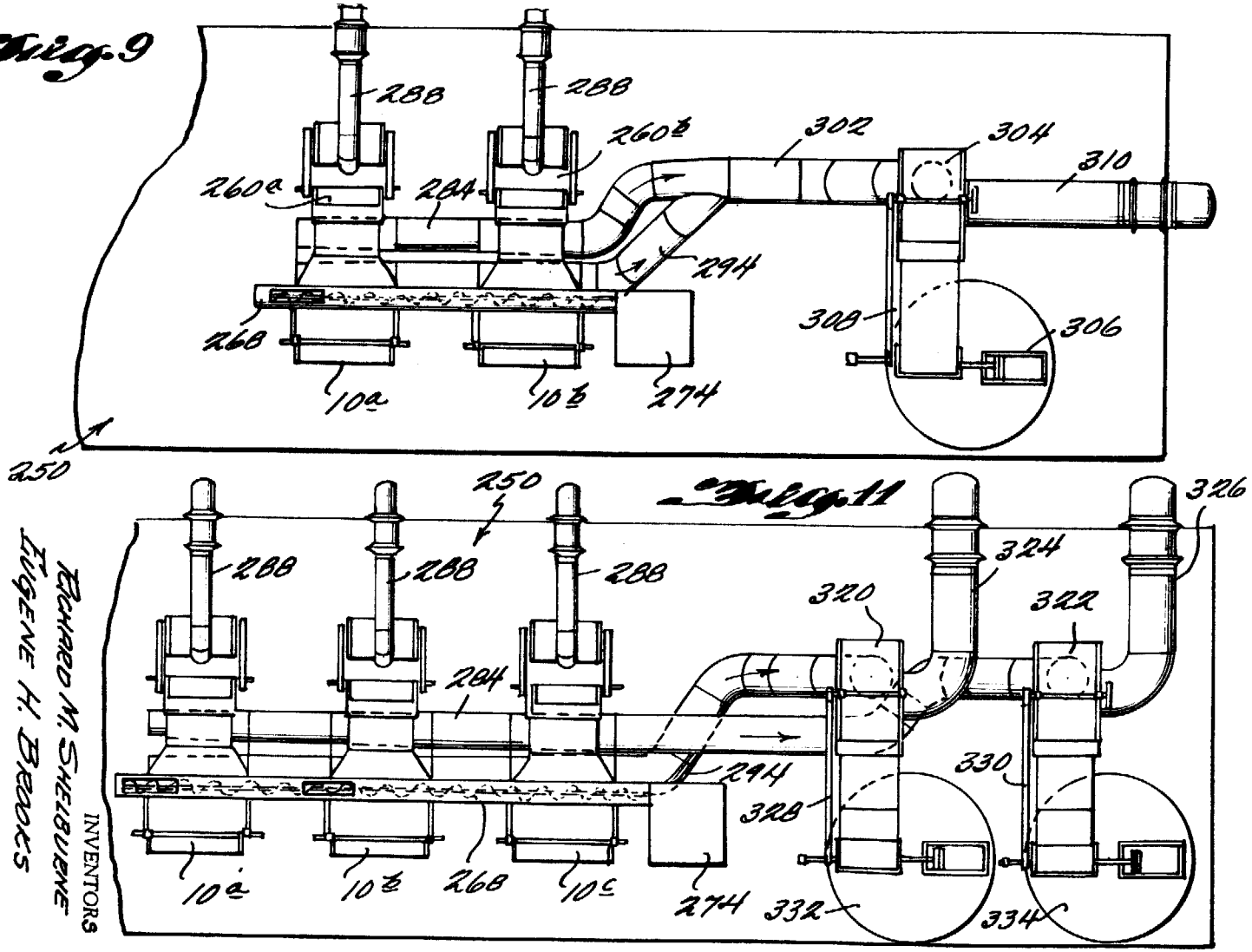
FIGURE 9 is a diagrammatic view of the installation in FIGURE 8.
FIGURE 11 is a diagrammatic plan view of the installation in FIGURE 10.

FIGURES 8 and 9 show a ginning installation which includes dual gin stands 10a and 10b according to this invention, while FIGURES 10 and 11 show an installation including three gin stands 10a, 10b and 10c according to this invention. In these installations, the output from the upper and lower gin stages 12 and 13 are fed to separate lint cleaners which might be desired to accommodate the high capacity of each of the dual gin stands, to thereby prevent overloading of any of the lint cleaning saw cylinders.

Referring now to FIGURES 8 and 9, there is shown a longitudinal building 250 having a raised floor 252 merging with a lower floor 254. The dual gin stands 10a and 10b are mounted on the raised floor 252 in side-by-side relationship. A platform 256, supported by stanchions 258, extends from the lower floor 254 above the gin stands 10a and 10b. This platform 256 carries upper lint cleaners 26a, each of these lint cleaners being connected to the respective upper discharge outlets 14 of each of the dual gin stands 10a and 10b.

Likewise, the floor 254 below the platform 256 carries lower lint cleaners 262a which are connected to the respective lower discharge outlets 15 of each of the dual gin stands 10a and 10b. In this regard, ducts 264 provide communication with the upper discharge outlets 14 and the upper lint cleaners 260a while ducts 266 connect the lower discharge outlets 15 with the lower lint cleaners 262a. Thus, there is provided for each dual gin stand two separate lint cleaners to accommodate the extremely high capacity of the gin stands and otherwise allow a smooth conveyance of the cotton.

The cotton is conveyed to the gin stands 10a and 10b via an overhead screw conveyor distributor 268 leading from a cleaning and drying system (not shown), communicating with each of the dual gin stands 10a and 10b by a hopper 270 and an extractor feeder 272 mounted on the top of each dual gin stand. The downstream end of the conveyor 268 communicates with an overflow stall 274, as is well known in the art. The upper floor 252 below the dual gin stands 10a and 10b carries a transversely extending seed conveyor 276 and a hull conveyor 278, while a prime mover, such as an electric motor 280, operates each gin stand 10a and 10b.

The lint cleaners 260a and 262a are known in the art, and are shown to be of single stage construction. Alternatively, the lint cleaners can be of the two-stage type, as disclosed in the patent to Shelburne, No. 3,027,-604. A by-pass duct 282 communicates with the upper duct 264 and an upper transverse lint flue 284. By virtue of this arrangement, the lint cleaner can be by-passed entirely by suitable valving (not shown) which optionally directs the ginned cotton through the upper duct 264 through the by-pass duct 282 and into the lint flue 284. Also a trash mainfold 286 extends transversely of the upper lint cleaners 260a to convey away trash removed by the upper lint cleaners 260a. An exhaust duct 288, carrying a fan 290 is joined to the condenser of the upper lint cleaners 260a and communicates with the upper edge of the building 250.

The lower lint cleaners 262a are constructed in an identical fashion, there being provided a by-pass duct 292 connected at its one end to the lower duct 266 and at its other end to a lower transverse lint flue 294. An exhaust duct 296 carrying a fan 298 provides communication of each lower lint cleaner 262a with the exterior of the building. The lower floor 254 is recessed to receive a trash manifold 300.

As best shown in FIGURE 9, the lint flues 284 and 294 merge with one another downstream of the lint cleaners 260a and 262a into a duct 302 which, in turn, connects with a condenser 304, of the well-known type. The condenser connects with a press 306 via a lint slide 308 as is known in the art, and a fan-carrying exhaust duct 310 provides communication between the condenser 304 and the exterior of the building.

The installation shown in FIGURES 8 and 9 is particularly well suited for processing the quantity of cotton that can be conveniently handled by a single press or baling device as is presently available in the art.

In FIGURES 10 and 11, there is shown a generally similar installation which is of a larger capacity. In this modification, separate condensers and presses are provided for handling the cotton from each of the upper and lower transverse line flues 284 and 294. This arrangement, as with the arrangement shown in FIGURES 8 and 9, is constructed to provide two lint cleaners for each dual gin stand 10, one lint cleaner above the other.

Referring now to FIGURES 10 and 11, wherein like numerals refer to similar elements, the platform 256 carries a two-stage lint cotton cleaner 312 of the type disclosed in the patent to Shelburne, No. 3,027,604. A second trash conveyor 314 is operative to convey trash from the lint cleaning first stage while the trash conveyor 286 carries trash away from the second stage. Likewise, the bottom outlet 15 of the gin stand 10a communicates with a lower, two-stage lint cleaner 316 via the duct 266 and a second trash conveyor 318 is operative to convey away trash from the first lint cleaning stage of the lint cleaner 316. As best shown in FIGURE 11, the lint flues 284 and 294 do not merge with one another as in FIGURE 9, but the upper flue 284 communicates with a condenser 320, while the lower flue 294 communicates with a condenser 322. Each of these condensers are provided with exhaust ducts 324 and 326, respectively. Communicating with each condenser via separate lint slides 328 and 330 are separate presses 332 and 334, respectively. In the operation of this arrangement, it is apparent that the ginned cotton from the upper outlets 14 of each of the dual gin stands 10a, 10b and 10c are successively pressed in the press 332, while the output from the lower outlets 15 of each of these gin stands is eventually pressed at 334.

By virtue of this arrangement, the cleaning and pressing equipment is operative to accommodate at higher capacity of the battery of dual gin stands, and otherwise enhances ginning production.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative and not in a limiting sense.

What is claimed is:

1. A dual gin stand of high ginning capacity comprising: a casing having a top, a bottom, an inlet side and an outlet side; means defining with said inlet side a single roll chamber; an upper ginning stage disposed within said casing, said upper stage including an upper saw cylinder lying partially in said roll chamber and further including upper doffing means opposite said upper saw cylinder; a lower ginning stage within said casing, said lower stage including a lower saw cylinder lying partially in said roll chamber below and parallel to said upper saw cylinder, said lower stage further including lower doffing means opposite said lower saw cylinder and lower mote handling means disposed adjacent said lower saw cylinder above said lower doffing means and below said upper doffing means, said lower mote handling means including an upper [surface] *element* covering a portion of said handling means; separate, vertically spaced lint exhaust ducts communicating with said upper and lower doffing means and extending to said outlet side, each of said ducts being defined at least in part by a scroll spaced from the respective doffing means, the scroll associated with said lower doffing means providing [an air inlet passage through the bottom of said casing to a low pressure point adjacent said lower saw cylinder, and the lower surface of the scroll associated with said upper doffing means defining with the upper surface of said lower mote handling means an air inlet passage which is disposed between said exhaust ducts and which extends through the outlet side of said casing to a low pressure point adjacent said upper saw cylinder, said air inlet passages] *an air inlet communicating with a low pressure point adjacent said lower saw cylinder, and the lower surface of the scroll associated with said upper doffing means being in spaced apart relationship to said upper element of said lower mote handling means so as to define with said upper element a space disposed between said exhaust ducts and extending through the outlet side of said casing to a low pressure point adjacent said upper saw cylinder whereby air may be passed from outside said casing through the space between said scroll and said upper element to said last-mentioned low pressure point, said air inlet and said space* thereby providing for efficient operation of said gin stages by supplying air for carrying away lint from said saw cylinders and doffing means, the arrangement of said upper stage above said lower stage thereby reducing the floor space occupied by said gin stand.

2. A gin stand as in claim 1 wherein *an air inlet gap is formed between the inner end of the scroll associated with said upper doffing means and said upper saw cylinder and communicates with said space for receiving the air passed therethrough.* [the ends of said inlet passages are defined by a gap formed between the inner end of the respective scroll and the respective saw cylinder]

3. A gin stand as in claim 1 wherein said upper and lower doffing means are disposed between their respective saw cylinders and said outlet side, said roll chamber being disposed on the opposite side of said saw cylinders from said upper and lower doffing means.

4. A gin stand as in claim 3 wherein said lower mote handling means includes a rotatable mote sweep disposed adjacent said lower saw cylinder and above said lower doffing means, a mote conveyor for receiving motes from said mote sweep and for conveying motes out of said gin stand in a direction parallel to the axes of said saw cylinders and a housing enclosing said mote conveyor, *said upper element defining a top cover plate for said housing.* [a portion of the exterior of said housing defining said upper surface of said mote handling means]

5. A gin stand comprising: means defining a roll box; a saw cylinder operating partially in said roll box; a rotary doffing means adjacent said saw cylinder; a rotary mote sweep adjacent said saw cylinder and including a shaft which carries at least one radially extending flexible paddle; scratcher means associated with said mote sweep for cleaning accumulated lint from the paddle, said scratcher means including a stationary plate having a longitudinal axis extending parallel to the shaft of said mote sweep and further having a plurality of scratcher points extending generally toward the shaft of said mote sweep and terminating in the path of movement of the paddle so as to be contacted thereby.

6. A gin stand as in claim 5 wherein said scratcher points are generally triangular and are formed by notches in one edge of said plate.

7. A gin stand as in claim 6 wherein said plate is generally V-shaped in transverse cross section, said notches being formed in one leg of the V and further comprising fastening means associated with the other leg of the V for adjustably securing the plate transversely of itself.

8. A gin stand comprising: a horizontally disposed saw cylinder; a roll box disposed on one side of said saw cylinder and receiving a peripheral portion thereof; doffing means disposed on generally the opposite side of said saw cylinder from said roll box; moting means disposed adjacent said saw cylinder and between said doffing means and said roll box, said moting means including a mote blade and a rotatable mote sweep disposed on the opposite side of the blade from said saw cylinder; a scroll disposed adjacent said saw cylinder at a location between said roll box and said moting means; and means mounting said scroll for adjustment toward and away from said saw cylinder whereby adjustment of the clearance between said scroll and said saw cylinder controls the amount of moting performed by said moting means.

9. A gin stand as in claim 8 wherein said scroll is linearly adjustable in a direction transverse to the axis of said saw cylinder and is rotatably adjustable about an axis parallel to the axis of said saw cylinder.

*10. An installation for processing cotton comprising: the dual gin stand of claim 1; a first lint cleaning machine spaced from said gin stand and operatively communicating with the lint exhaust duct from said lower ginning stage; and a second lint cleaning machine disposed above said first lint cleaning machine and operatively communicating with the lint exhaust duct from said upper ginning stage.*

*11. An installation as in claim 10 including a plurality of said dual gin stands each with its respective first and second lint cleaning machines, said gin stands being disposed in side-by-side relationship, said installation further including a lower lint flue receiving lint from all the lower lint cleaning machines and an upper lint flue receiving lint from all the upper lint cleaning machines.*

References Cited

The following references, cited by the Examiner, are of record in the patented file of this patent on the original patent.

UNITED STATES PATENTS

| | | | |
|---|---|---|---|
| 296,659 | 4/1888 | Webb | 19—58 |
| 462,189 | 10/1891 | Bachman | 19—57 |
| 504,023 | 8/1893 | Davis et al. | 19—57 |
| 508,126 | 11/1893 | Bachman | 19—57 |
| 555,789 | 3/1896 | Munger | 19—39 |
| 865,232 | 9/1907 | Bradford | 19—64 |
| 1,124,094 | 1/1915 | Wooldridge | 19—58 |
| 1,175,193 | 3/1916 | Taylor | 19—56 |
| 1,220,879 | 3/1917 | Mullen | 19—58 |
| 1,278,649 | 9/1918 | Henry. | |
| 1,436,372 | 11/1922 | Vardell | 19—55 |
| 1,460,220 | 6/1923 | Allen | 19—60 |
| 1,464,810 | 8/1923 | Evans | 19—57 |
| 1,542,293 | 6/1925 | Evans | 19—59 |
| 2,137,744 | 11/1938 | Streun | 19—55 |
| 2,155,181 | 4/1939 | Deems | 19—55 |
| 2,187,673 | 1/1940 | Wallace | 19—56 |
| 2,418,694 | 4/1947 | Brooks | 19—39 |
| 2,658,239 | 11/1953 | Day | 19—59 |
| 2,776,455 | 1/1957 | McGregor | 19—58 |
| 2,977,641 | 4/1961 | Brooks | 19—57 X |
| 3,162,902 | 12/1964 | Wallace | 19—59 |

MERVIN STEIN, *Primary Examiner.*

DORSEY NEWTON, *Assistant Examiner.*